United States Patent
Choi

(10) Patent No.: US 6,786,212 B1
(45) Date of Patent: Sep. 7, 2004

(54) METHOD FOR PREVENTING A REVERSE ROTATION OF AN ENGINE

(75) Inventor: Ji Hyeon Choi, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,905

(22) Filed: Dec. 29, 2003

(30) Foreign Application Priority Data

Oct. 22, 2003 (KR) ................................. 10-2003-0073882

(51) Int. Cl.⁷ ............................................. F02P 11/00
(52) U.S. Cl. ..................................... 123/631; 123/630
(58) Field of Search .............................. 123/631, 630, 123/632, 594, 319

(56) References Cited

U.S. PATENT DOCUMENTS

| | | | | |
|---|---|---|---|---|
| 4,953,520 A | * | 9/1990 | Hashizume | ................. 123/631 |
| 6,438,487 B1 | * | 8/2002 | Mingo et al. | ............... 701/113 |

* cited by examiner

Primary Examiner—Bibhu Mohanty
(74) Attorney, Agent, or Firm—Morgan Lewis & Bockius LLP

(57) ABSTRACT

The present invention includes a method for preventing a reverse rotation of an engine. In connection with starting an engine, when an operation of a starter motor stops while a predetermined monitoring condition for a reverse rotation is satisfied, it is determined whether a reverse rotation of the engine is occurring, and then at least one of fuel injection and ignition of the engine is stopped for a certain period if it is determined that the engine undergoes reverse rotation.

16 Claims, 7 Drawing Sheets tnbm:Time intervals between adjacent CPS signals detected by CPS

METHOD FOR PREVENTING A REVERSE ROTATION OF AN ENGINE

CROSS-REFERENCE TO RELATED APPLICATIONS

This application claims the benefit of priority of Korean Application No. 10-2003-0073882, filed on Oct. 22, 2003, the disclosure of which is incorporated herein by reference in its entirety.

FIELD OF THE INVENTION

Generally, the present invention relates to a method for controlling an engine. More particularly, the present invention relates to a method for preventing a reverse rotation of an engine.

BACKGROUND OF THE INVENTION

Reverse rotation of an engine may cause damage to various parts of the engine, including the intake manifold.

An intake manifold which receives air from a throttle valve and distributes it to intake ports in a cylinder head is usually made of a plastic or aluminum material. With regards to intake manifolds made of plastic material, some cases have been found in which the intake manifolds are damaged due to a backfire.

A typical backfire of an engine is known to occur when ignition occurs near top dead center (TDC) where a valve overlap happens, or when hot combustion gas flows back to an intake port during the overlap. However, a backfire that damages an intake manifold has been found to be caused by a reverse rotation of the engine that may happen during starting of the engine.

When an engine is stopped while in a process of starting, it may have a cylinder that is in a compression stroke at the moment of stopping. A compression pressure formed in the cylinder may push a piston toward bottom dead center (BDC), and thereby the engine may reversely rotate. In this case, when an engine speed becomes higher than a certain speed, a cylinder in which fuel has already been injected may experience ignition so the reverse rotation of the engine may be accelerated.

When an engine cycle is executed in a reverse sense from a compression stroke to an intake stroke, a compressed air/fuel mixture may flow back to an intake manifold during the intake stroke through an open intake valve. So, a first interior pressure is formed in the intake manifold. As the engine experiences further reverse rotation, the same or another intake valve may open such that a pressure is added again and again to the interior pressure resulting in damage to the intake manifold.

In addition to such damage to an intake manifold, a reverse rotation of an engine may cause further problems such as excess bearing wear.

The information disclosed in this Background of the Invention section is only for enhancement of understanding of the background of the invention and should not be taken as an acknowledgement or any form of suggestion that this information forms the prior art that is already known to a person of ordinary skill in the art.

SUMMARY OF THE INVENTION

The motivation for the present invention is to provide a method for preventing a reverse rotation of an engine having non-limiting advantages of preventing a reverse rotation of an engine during starting.

An exemplary method for preventing a reverse rotation of an engine according to an embodiment of the present invention includes determining if a predetermined monitoring condition for monitoring a reverse rotation of the engine is satisfied, determining if an operation of a starter motor has stopped when the monitoring condition is satisfied, determining if the reverse rotation of the engine is occurring when the operation of the starter motor has stopped, and stopping fuel injection and/or ignition of the engine when the reverse rotation of the engine is occurring.

In a further embodiment, an exemplary method for preventing a reverse rotation of an engine according to an embodiment of the present invention further includes determining if starting of the engine is finished when the monitoring condition is not satisfied, wherein the determining if the predetermined monitoring condition is satisfied is executed when the starting of the engine is not finished.

In another further embodiment, the predetermined monitoring condition comprises a plurality of conditions, including, but not limited to: (1) a crank position sensor (CPS) and a vehicle speed detector are operating normally; (2) an ignition key is in an on position; (3) an engine speed is less than or equal to a predetermined reference engine speed, or a rate of change of the engine speed is less than or equal to a predetermined rate of change; (4) sufficient signals are obtained from the CPS such that cylinders may be identifiable on the basis thereof; and (5) the vehicle speed is less than or equal to a predetermined reference vehicle speed.

In a further embodiment, the reference engine speed is preset lower than a predetermined idle speed of the engine, and the predetermined engine speed rate of change is a negative value such that an engine stall may be expected in the case that the rate of change of the engine speed becomes less than the predetermined rate of change.

In another further embodiment, the reference vehicle speed is preset as a minimal value indicative of a running of the vehicle.

In another further embodiment, whether the operation of a starter motor has stopped is determined on the basis of a current battery voltage of the vehicle.

In a still further embodiment, whether the operation of a starter motor has stopped is determined on the basis of whether the current battery voltage is greater than a predetermined voltage, the predetermined voltage being lower than a battery voltage output in the case that the engine is stopped.

In another further embodiment, whether the reverse rotation of the engine is occurring is determined on the basis of intervals between adjacent signals from the CPS.

In a still further embodiment, the intervals between adjacent signals comprise first, second, and third intervals that are consecutively obtained, and whether the reverse rotation of the engine is occurring is determined on the basis of whether the second interval is greater than the first and third intervals and also greater than a predetermined reference interval.

In another further embodiment, an exemplary method for preventing a reverse rotation of an engine according to an embodiment of the present invention further includes determining a reversion-triggering cylinder which is in a compression stroke at the time when the reverse rotation of the engine is occurring.

In a still further embodiment, the determining a reversion-triggering cylinder determines the reversion-triggering cylinder on the basis of: a predetermined combustion sequence of cylinders of the engine; and TDC of a compression stroke of a reference cylinder, the TDC being determined by a reference pulse of a CPS signal.

In another further embodiment, an exemplary method for preventing a reverse rotation of an engine according to an embodiment of the present invention further includes calculating a piston angle of the reversion-triggering cylinder at the time of occurrence of the reverse rotation of the engine, wherein whether the reverse rotation of the engine is occurring is determined on the basis of the piston angle of the reversion-triggering cylinder.

In a still further embodiment, the reverse rotation of the engine is determined to be occurring when the piston angle of the reversion-triggering cylinder lies in a range preceding TDC of the reversion-triggering cylinder.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
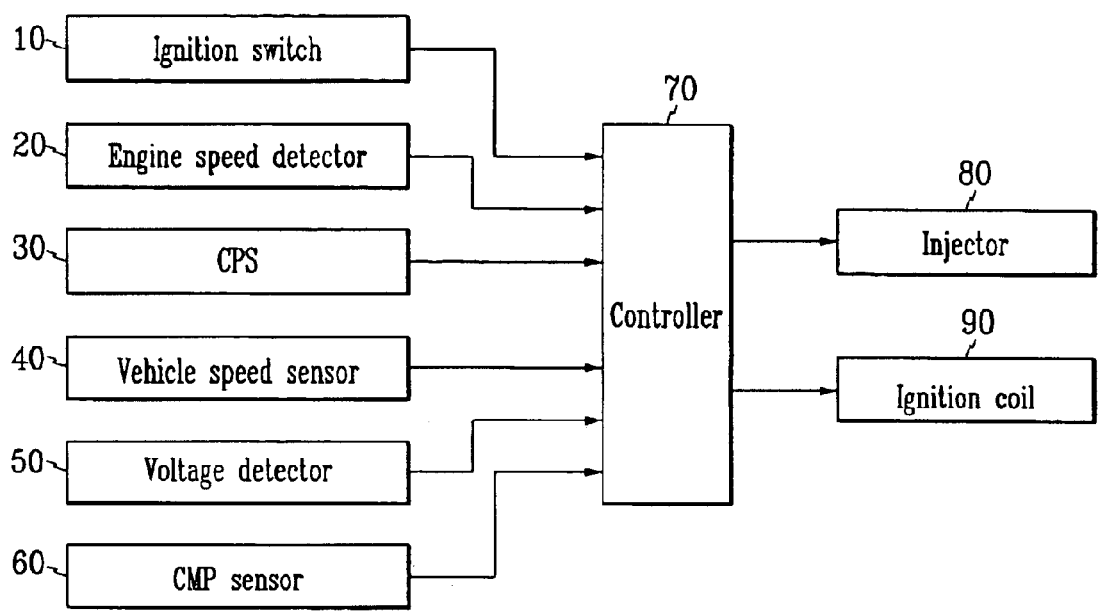
FIG. 1 is a block diagram of an apparatus for preventing a reverse rotation of an engine according to an embodiment of the present invention.

As shown in FIG. 1, an apparatus for preventing a reverse rotation of an engine according to an embodiment of the present invention includes an ignition switch 10 for controlling electric power supply to an engine of a vehicle, an engine speed detector 20 for detecting an engine speed, a crank position sensor (hereinafter referred to as a CPS) 30 for detecting a crank angle of the engine, a vehicle speed sensor 40 for detecting a speed of the vehicle, a voltage detector 50 for detecting a battery voltage of the vehicle, a camshaft position sensor (hereinafter referred to as a CMP sensor) 60, all of which communicate with a controller 70. The apparatus of FIG. 1 also comprises an injector 80, and an ignition coil 90 that operate under control of controller 70.

The ignition switch 10 detects a position of an ignition key and outputs a signal corresponding thereto.

The engine speed detector 20 detects a current engine speed based on a rotation angle of a crankshaft, and outputs a signal corresponding thereto.

The CPS 30 detects rotation of teeth of a toothed wheel (not shown) formed at the crankshaft, and outputs a signal corresponding thereto.

The vehicle speed sensor 40 detects a current vehicle speed through detecting a rotation speed of an output driven gear of a transmission of the vehicle, and outputs a signal corresponding thereto.

The voltage detector 50 detects a voltage of a battery of the vehicle, and outputs a signal corresponding thereto.

The CMP sensor 60 detects a rotation angle of a camshaft for operating intake and/or exhaust valves of the engine, and outputs a signal corresponding thereto.

Signals output from ignition switch 10, engine speed detector 20, CPS 30, vehicle speed sensor 40, voltage detector 50, and CMP sensor 60 are preferably supplied to controller 70.

The injector 80 is mounted to a respective cylinder of the engine, and injects fuel into the cylinder under a control signal of the controller 70.

The ignition coil 90 enables an electric discharge into the cylinder under a control signal of the controller 70.

The controller 70 can be realized by one or more processors activated by a predetermined program, and the predetermined program can be programmed to perform each step of a method according to an embodiment of this invention.

A method for preventing a reverse rotation of an engine according to an embodiment of the present invention is hereinafter described with reference to FIG. 2, and with further reference to FIGS. 3–7.

Figure 2:
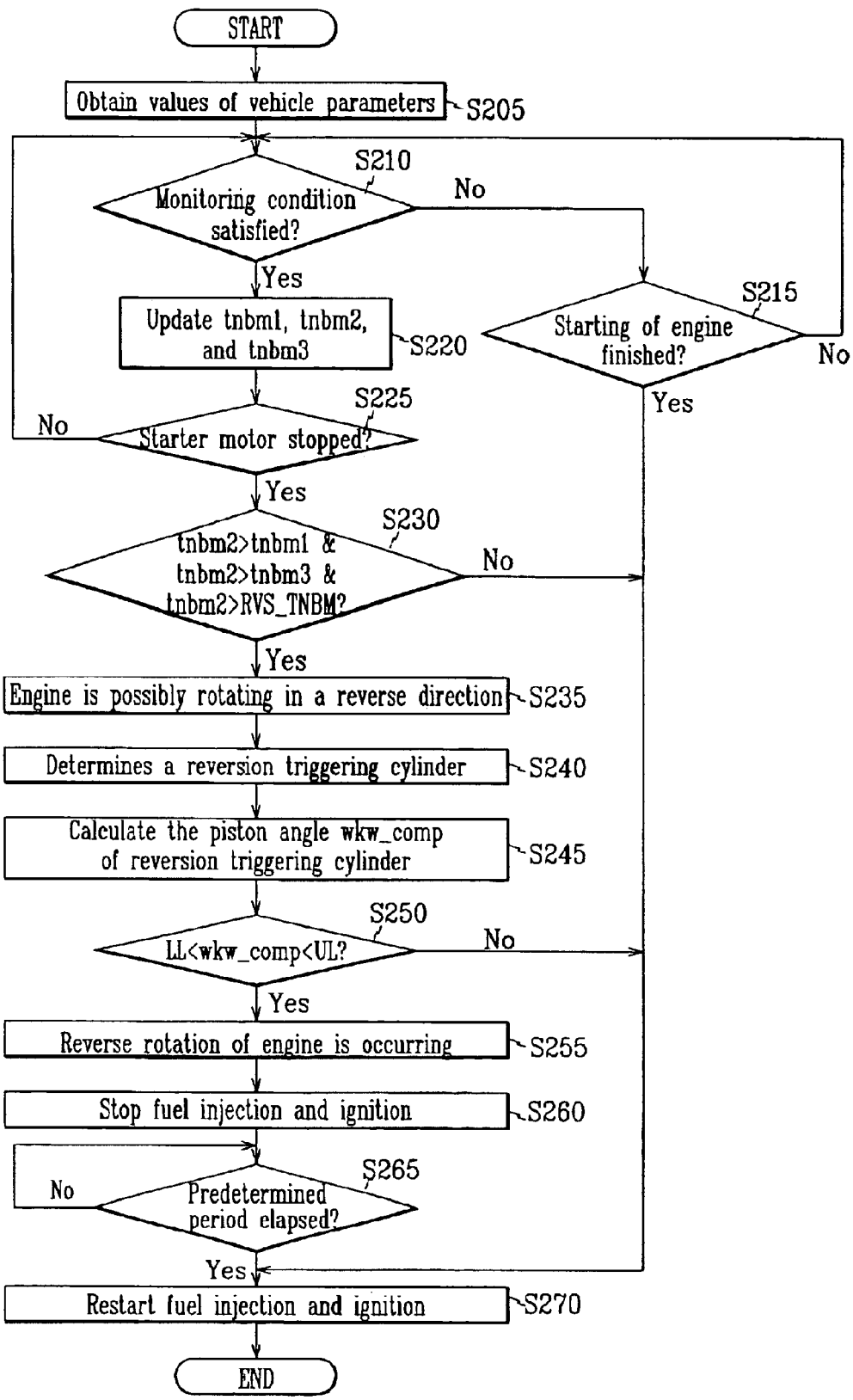
FIG. 2 is a flowchart showing a method for preventing a reverse rotation of an engine according to an embodiment of the present invention.

When an ignition switch 10 is turned on (and also when starting of the engine begins), as indicated by "Start" in FIG. 2, the controller 70 obtains values for vehicle parameters at step S205.

The vehicle parameters preferably include one or more of: a current operating position of the ignition switch 10, an engine speed from the engine speed detector 20, a crank position angle from the CPS 30, a current vehicle speed from the vehicle speed sensor 40, a battery voltage from the voltage detector 50, and a camshaft angle from the CMP sensor 60.

Subsequently at step S210, the controller 70 determines if the vehicle parameters satisfy a predetermined monitoring condition for a reverse rotation of the engine.

For example, according to a preferred embodiment of the present invention, the predetermined monitoring condition is preset as a combination of the following six conditions 1) The crank position sensor (CPS) 30 should operate normally since a reverse operation of an engine is determined based on signals from the CPS 30. Such signals are converted to parameters, denoted tnbm1, tnbm2, and tnbm3, which represent time intervals between adjacent CPS signals.

2) The vehicle speed sensor 40 should also operate normally.

3) The ignition switch 10 should be at an on position.

4) A current engine speed should be less than or equal to a predetermined reference engine speed (RPM_THRESHOLD), or a rate of change of the engine speed should be less than or equal to a predetermined rate of change (RPM_GRADIENT).

This is because a reverse rotation of an engine only occurs at a very low engine speed, so when an engine speed exceeds a predetermined reference engine speed, reverse rotation does not need to be monitored. Here, the reference engine speed RPM_THRESHOLD is preset lower than a predetermined idle speed IDLE_RPM of the engine, which may be preset by a person of ordinary skill in the art. In addition, the predetermined engine speed rate of change RPM_GRADIENT is a negative value such that an engine stall may be expected in the case that the rate of change of the engine speed becomes less than the predetermined rate of change RPM_GRADIENT.

5) Sufficient signals should have been obtained from the CPS 30 such that cylinders may be identifiable on the basis thereof.

That is, at least one missing tooth of the toothed wheel (not shown) has been detected by the CPS 30.

6) A vehicle speed should be less than or equal to a predetermined reference vehicle speed VEHICLE_SPEED.

That is, when a vehicle is running at a certain speed, a reverse rotation of the engine need not be considered. Therefore, the predetermined reference vehicle VEHICLE_SPEED is preset as a value that may be a criterion of whether a vehicle is running, e.g., as a creeping speed (e.g., 2 km/h).

In a preferred embodiment of the present invention, when the above mentioned six conditions are all satisfied, the monitoring condition for a reverse rotation is satisfied.

When at least one of the six conditions is not satisfied, at step S215, the controller 70 determines if starting of the engine has been finished. Whether or not the starting of the engine has finished may be determined on the basis of whether the engine speed detected by the engine speed detector 20 exceeds a predetermined threshold speed.

When the starting of the engine is determined to have finished at step S215, a method for preventing a reverse rotation of an engine according to an embodiment of the present invention finishes after confirming that fuel injection and ignition control is maintained at step S270.

When the starting of the engine is determined to have not yet finished at step S215, the step S210 of determining if the predetermined monitoring condition for a reverse rotation is satisfied is executed such that the monitoring condition for a reverse rotation is repeatedly checked until the starting of the engine becomes finished.

When the monitoring condition for a reverse rotation is satisfied at the step S210, the controller 70 updates, at step S220, values of parameters tnbm1, tnbm2, and tnbm3 that are stored therein.

The parameters tnbm1, tnbm2, and tnbm3 denote intervals between adjacent CPS signals detected by the CPS 30, and they are respectively referred to as first, second, and third intervals hereinafter. According to a preferred embodiment of the present invention, the first, second, and third intervals tnbm1, tnbm2, and tnbm3 are consecutively obtained intervals.

In more detail, the first, second, and third intervals tnbm1, tnbm2, and tnbm3 mean periods elapsed for each tooth distance of the toothed wheel as the toothed wheel (not shown) formed at the crankshaft rotates. For example, in the case that the toothed wheel has 60 teeth including missing teeth, the first, second, and third intervals tnbm1, tnbm2, and tnbm3 each denote periods of time required for the crankshaft to rotate by 6°.

While the monitoring condition for a reverse rotation is satisfied, the parameters tnbm1, tnbm2, and tnbm3 are repeatedly updated according to a rotation of the crankshaft until the starter motor stops.

Current values of the first, second, and third intervals tnbm1, tnbm2, and tnbm3 are the most recently obtained and stored values (refer to steps S210, S220, and S225).

After the first, second, and third intervals tnbm1, tnbm2, and tnbm3 are updated at the step S220, the controller 70 determines, at step S225, if an operation of a starter motor has stopped on the basis of the battery voltage.

Since a reverse rotation of the engine does not occur while the starter motor is operating, an occurrence of the reverse rotation of the engine is checked in the case that the starter motor has stopped, according to an embodiment of a method for preventing a reverse rotation of an engine of the present invention.

Figure 3:
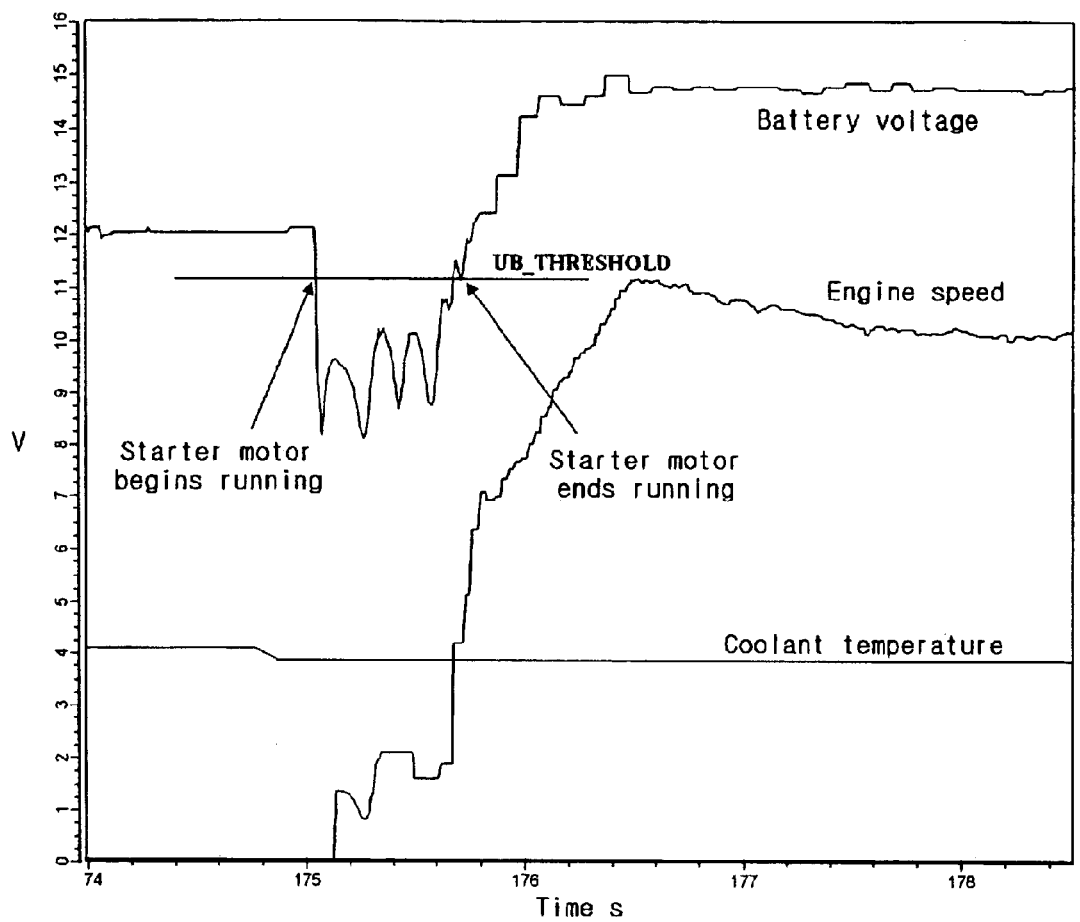
FIG. 3 is a graph showing an exemplary pattern of a battery voltage change according to an operation of a starter motor according to a method for preventing a reverse rotation of an engine according to an embodiment of the present invention.

Whether the operation of a starter motor has stopped may be determined on the basis of the battery voltage detected by the voltage detector 50. That is, as shown in FIG. 3, the battery voltage is at about 12V before the operation of the starter motor, and it drops at a starting of the operation of the starter motor due to a significant current consumption of the starter motor. When the operation of the starter motor stops and the engine normally runs, the battery voltage becomes about 14V–15V due to electrical generation of the engine. Therefore, whether the operation of the starter motor has stopped may be indirectly determined by a comparison of the battery voltage with a predetermined reference voltage UB_THRESHOLD.

Thus, according to an embodiment of the present invention, whether the operation of the starter motor has stopped is determined by whether the battery voltage becomes above the predetermined reference voltage UB_THRESHOLD. In this case, the predetermined reference voltage UB_THRESHOLD is set as 1V–2V lower than one formed before the operation of the starter motor (i.e., as about 10–12V).

When the starter motor is determined not to have stopped at the step S225, the step S210 of determining if the predetermined monitoring condition for a reverse rotation is satisfied is executed such that the monitoring condition for a reverse rotation is repeatedly checked while the starter motor is operating.

When the starter motor is determined to have stopped at the step S225, the controller 70 preliminarily determines at step S230 a reverse rotation of the engine on the basis of the first, second, and third intervals tnbm1, tnbm2, and tnbm3 obtained by the CPS 30.

At the step S230, the controller 70 determines that a reverse rotation of the engine is possibly occurring if the second interval tnbm2 in the middle of the three intervals tnbm1, tnbm2, and tnbm3 is bigger than others, and the second interval tnbm2 is greater than a predetermined reference interval RVS_TNBM.

Figure 4:
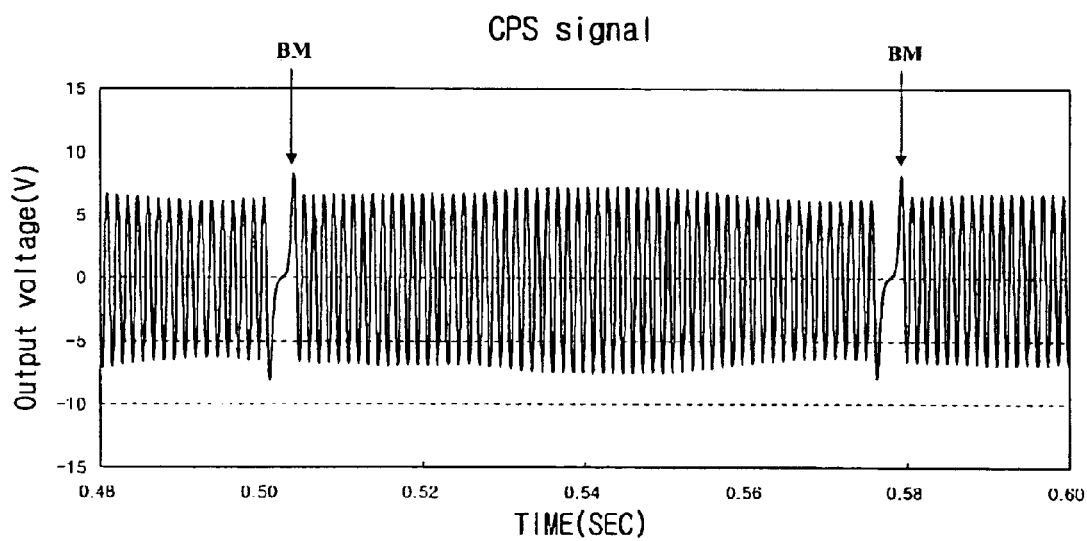
FIG. 4 illustrates a waveform of an output signal of a crank position sensor (CPS) obtained at a fixed engine speed.

A possibility of a reverse rotation of the engine may be determined by such a step S230 for the following reasons. A cylinder of the engine can be identified and rotation angle and speed of a crankshaft can be calculated on the basis of signals from the CPS 30. For example, in the case that a toothed wheel having 60 teeth including missing teeth is rotating at a constant speed, an output signal of the CPS 30 may be obtained as shown in FIG. 4. Such a raw signal of the CPS 30 is converted to a digital signal by an A/D converter, and then a pulse signal nbm may be obtained as shown in FIG. 5.

Figure 5:
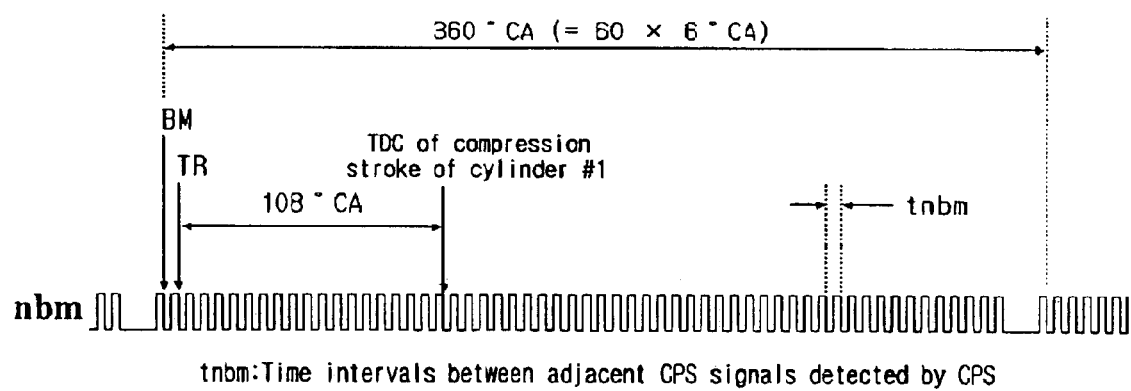
FIG. 5 illustrates a converted waveform obtained when the CPS signal of FIG. 4 is converted to a digital signal.

A reference sign BM in FIG. 4 and FIG. 5 denotes a falling edge regarding a directly subsequent tooth after the missing teeth, and it forms a reference position having a physical ground related to the missing teeth.

A reference sign TR in FIG. S denotes a reference position having a soft ground preset for identifying TDC of a reference cylinder. That is, the controller calculates rotation angle of each cylinder by counting the number of pulses subsequent from the point TR that is after the point BM.

When the engine speed changes, the output signal of the CPS 30 shows changes in its amplitude (i.e., voltage) and frequency rather than showing constant values thereof as in FIG. 4.

Figure 6:
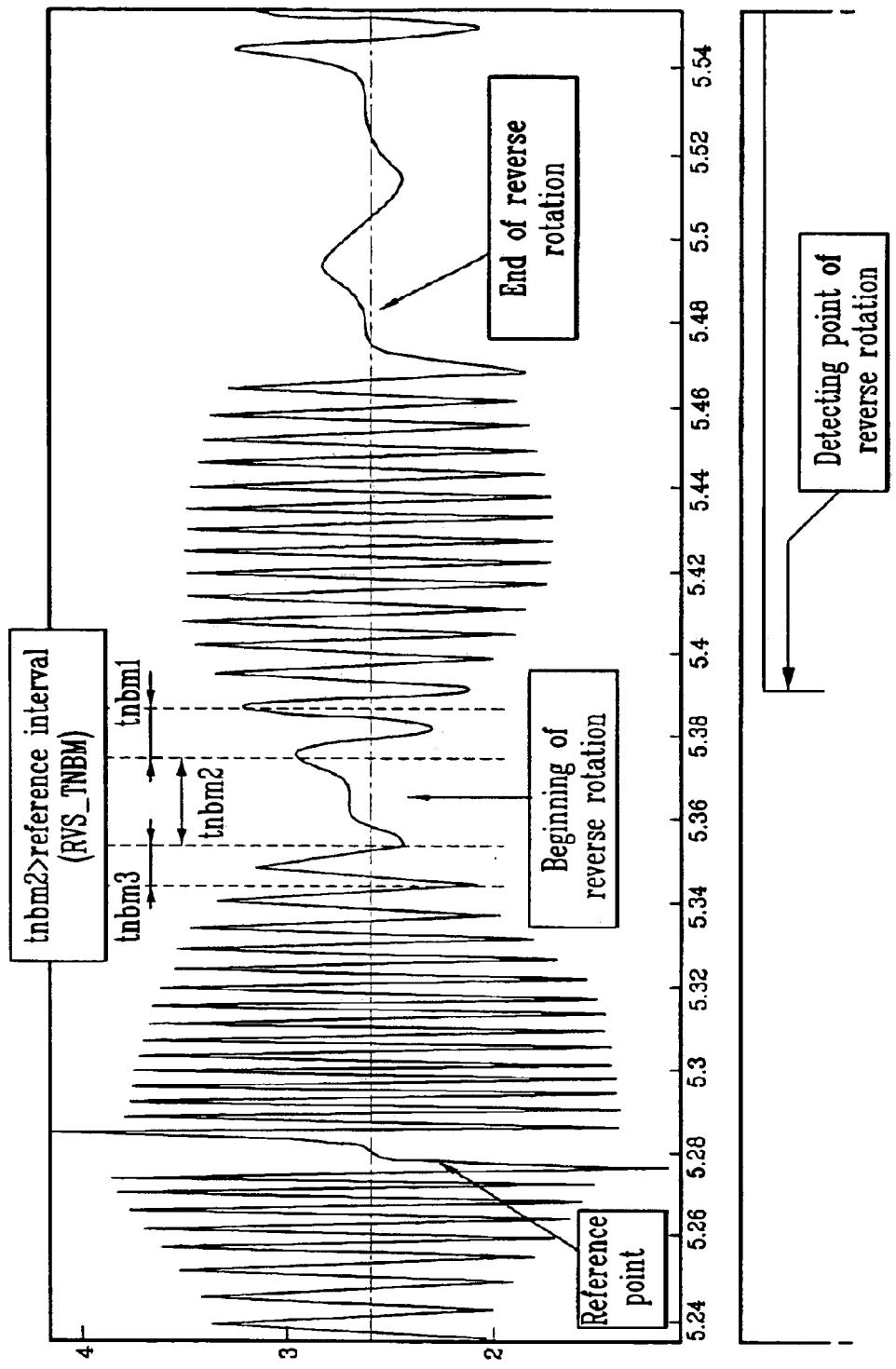
FIG. 6 illustrates an exemplary waveform for showing how a CPS signal changes when a reverse rotation of an engine occurs, which is considered in a method for preventing a reverse rotation of an engine according to an embodiment of the present invention.

That is, as can be seen in FIG. 6, amplitude and frequency of the CPS signal increase as the engine speed increases, and they decrease as the engine speed decreases. So the pulse intervals tnbm1, tnbm2, and tnbm3 detected by the CPS 30 vary with engine speed, and accordingly the controller 70 can calculate the engine speed from the pulse intervals tnbm1, tnbm2, and tnbm3.

In this sense, the controller 70 can determine a reverse rotation of an engine on the basis of the pulse intervals tnbm1, tnbm2, and tnbm3 as mentioned in the step S230. The step S230 is hereinafter described in further detail with reference to FIG. 6.

If an engine that has once driven by a starter motor should rotate in a reverse direction, the engine must stop at a certain time point and must then be reversely accelerated thereafter. In this case, a pulse interval of the CPS signal that contains the stopping point of the engine is longer than pulse intervals obtained when the engine is rotating either forwardly or reversely.

When the rotation of the engine is changed from a forward rotation to a reverse one, three pulse intervals of a pulse interval (i.e., tnbm1) during the forward rotation, a pulse interval (i.e., tnbm2) containing the stopping point, and a pulse interval (i.e., tnbm3) during the reverse rotation are consecutively obtained. Therefore, when the rotation of the engine is changed from a forward rotation to a reverse one, an intervening interval of the second interval tnbm2 must be biggest among the first, second, and third intervals tnbm1, tnbm2, and tnbm3.

However, the case that the second interval tnbm2 becomes the biggest among the three may occur when the engine speed fluctuates. So, at the step S230, a further condition that the second interval should be greater than the predetermined reference interval RVS_TNBM is adopted to determine that the engine is possibly rotating in a reverse direction.

The pulse interval containing the stopping point of the engine must be sufficiently larger than pulse intervals occurring while the engine is rotating, so the reference interval RVS_TNBM may be set as a value that can differentiate the two cases of the engine operation. Such a reference interval RVS_TNBM can be set by a person of ordinary skill in the art from experiments or models of artificial realization of a reverse rotation of an engine.

The reference interval RVS_TNBM set as such may be stored in the controller 70 as a predetermined map table such that values of the map table can be retrieved when needed.

When the first, second, and third intervals tnbm1, tnbm2, and tnbm3 satisfy the above mentioned conditions at step S230, the controller 70 determines that the engine is possibly rotating in a reverse direction at step S235. The step S235 may be realized as the controller 70 sets a predetermined flag B_rvs to a value "1".

Subsequently at step S240, the controller 70 identifies a cylinder (referred to as a reversion-triggering cylinder hereinafter) from which the reverse rotation of the engine may originate.

If a reverse rotation of an engine originates at a specific cylinder, the cylinder must be in a compression stroke at the time when the reverse rotation of the engine starts, and the compression pressure must be sufficiently high so as to push down a piston in the cylinder. However, when the specific cylinder is very near the end of its compression stroke (i.e., TDC), the piston may not be easily reversed by compression pressure only. In other words, in order to trigger a reverse rotation of the engine, an angular position of the piston of the specific cylinder should precede TDC by at least a certain level at the time when the rotation of the engine stops.

Therefore, the controller 70 determines the reversion-triggering cylinder at step S240, calculates a piston angle wkw_comp of the reversion-triggering cylinder at step S245, and then at step S250, determines if the piston angle wkw_comp lies in a predetermined angle range preceding TDC.

The step S240 identifies the reversion-triggering cylinder on the basis of TDC of the compression stroke of a reference cylinder (e.g., cylinder #1) and a predetermined combustion sequence of cylinders of, the engine. TDC of the compression stroke of the reference cylinder is determined by a reference pulse (refer to BM or TR in FIG. 5) of a CPS signal.

The piston angle wkw_comp of the reversion-triggering cylinder is an angle obtained when a full stroke of the piston from BDC to TDC of the reversion-triggering cylinder is scaled to a value in the range 0°–180°.

The reversion-triggering cylinder and the piston angle can be calculated on the basis of a crank angle at the moment that the possibility of the reverse rotation of the engine is determined at the step S230, which is further described hereinafter with reference to FIG. 7.

Figure 7:
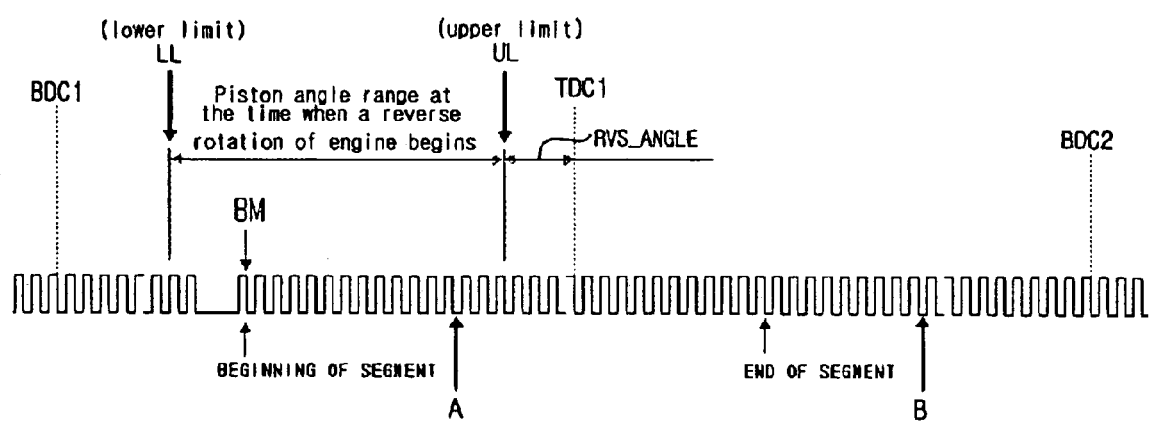
FIG. 7 is an exemplary waveform for showing crank positions where a reverse rotation of an engine may be determined to occur according to a method for preventing a reverse rotation of an engine according to an embodiment of the present invention.

In FIG. 7, TDC and BDC are marked with reference to the reference cylinder (e.g., cylinder #1) of the engine.

As an example, when a reverse rotation of the engine happens at a point A, the cylinder #1 is determined as the reversion-triggering cylinder since the point A slightly precedes top dead center TDC1 of the compression stroke of the cylinder #1. In addition, the piston angle wkw_comp of the cylinder #1 is calculated as an angle from bottom dead center BDC1 of the cylinder #1 to the point A.

As another example, when a reverse rotation of the engine happens at a point B, a cylinder that is combusted subsequently to the cylinder #1 is determined as the reversion-triggering cylinder. The cylinder that is combusted subsequently to the cylinder #1 is determined based on a predetermined combustion sequence of cylinders. For example, when the engine has four cylinders of which the combustion sequence is 1-3-4-2, the reversion-triggering cylinder is determined as cylinder #3.

When the reversion-triggering cylinder is determined and the piston angle wkw_comp of the reversion-triggering cylinder is calculated at the steps S240 and S245 of FIG. 2, the controller 70 determines at step S250 if the piston angle of the reversion-triggering cylinder lies in a range preceding TDC of the reversion-triggering cylinder.

The predetermined angle range may be defined by an upper limit UL and a lower limit LL.

The upper limit UL may be set, based on a predetermined minimal reverse angle RVS_ANGLE, as a value of 180-RVS_ANGLE. This implies that a reverse rotation can be triggered by a compression pressure of a cylinder only if a piston angle precedes TDC of the cylinder by at least a minimal angle RVS_ANGLE. A preferable value of the upper limit UL may be obtained experimentally by a person ordinarily skilled in the art.

In addition, a preferable value of the lower limit LL may also be obtained experimentally by a person ordinarily skilled in the art. As an example, the lower limit LL may be set as a value that is smaller than the upper limit UL by about 60°.

When the predetermined monitoring condition is satisfied (refer to the step S210 in FIG. 2), the starter motor has stopped (refer to the step S225), pulse intervals satisfy the above-mentioned condition (refer to the step S230), and the piston angle wkw_comp is found to lie in a predetermined angle range preceding TDC of the reversion-triggering cylinder, the controller 70 finally determines at step S255 that the reverse rotation of the engine is occurring.

Then at step S260, the controller 70 stops at least one of, but preferably both, fuel injection and ignition of the engine, and subsequently at step S265, the controller 70 determines if a predetermined period has elapsed after the stopping of the fuel injection and/or ignition of the engine.

When the predetermined period has not yet elapsed, the controller 70 maintains the stopping of the fuel injection and/or the ignition of the engine. When the predetermined period has elapsed, the controller 70 restarts the fuel injection and/or the ignition of the engine at step S270, so that a method for preventing a reverse rotation of an engine according to an embodiment of the present invention is completed.

Figure 8:
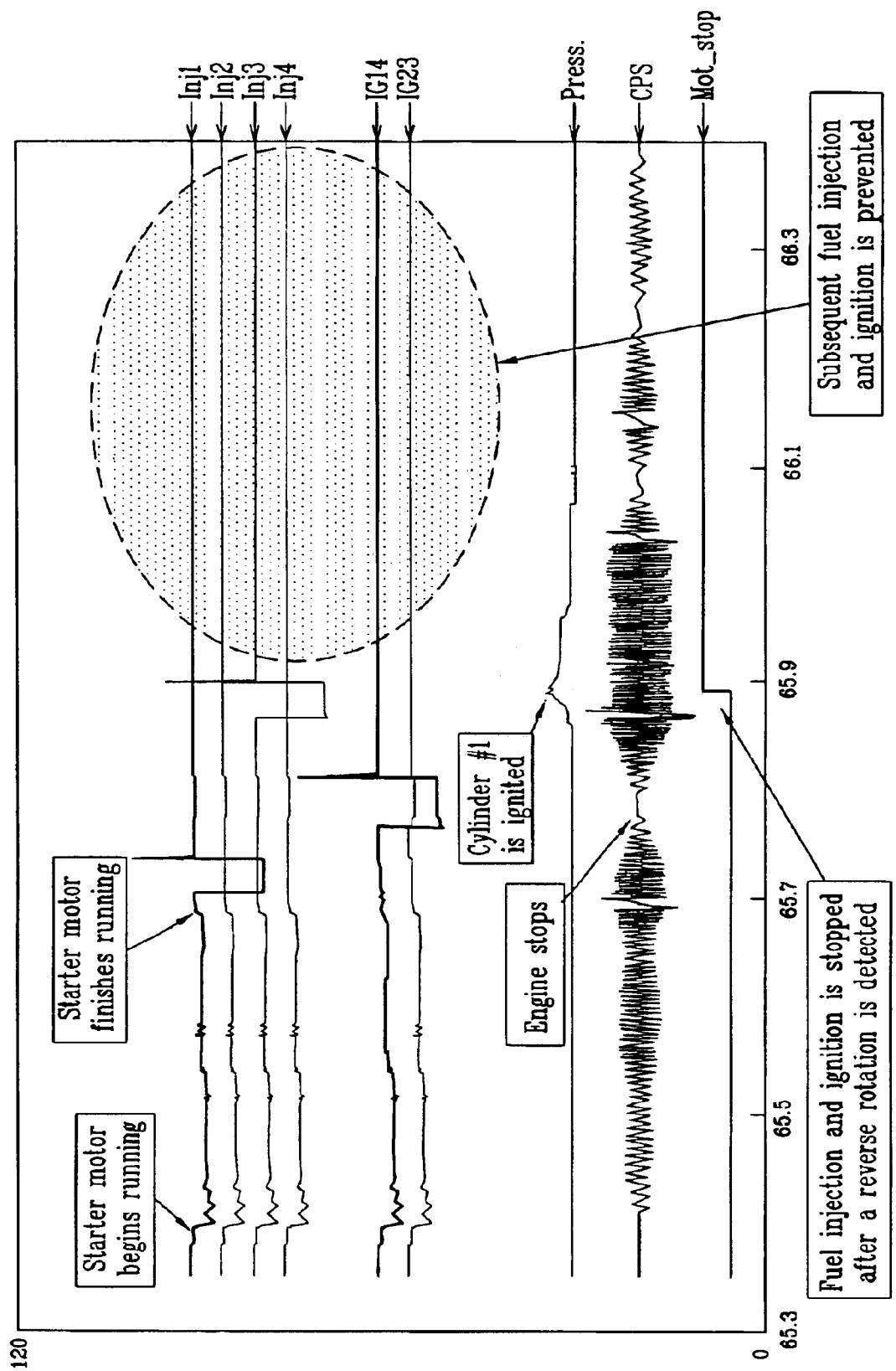
FIG. 8 is a graph for showing an effect of a method for preventing a reverse rotation of an engine according to an embodiment of the present invention.

As can be seen in FIG. 8, according to an embodiment of the present invention, repeated reverse-directing combustions of an engine are prevented in the case that a reverse rotation of an engine happens during starting of the engine.

Therefore, various problems that are expected to be caused by the reverse rotation of the engine may be prevented according to methods of the present invention. For example, damage of an intake manifold due to an accumulated pressure increase therein may be prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for preventing a reverse rotation of an engine, comprising:
   determining if a predetermined monitoring condition for monitoring a reverse rotation of the engine is satisfied;
   determining if an operation of a starter motor has stopped, when the monitoring condition is satisfied;
   determining if the reverse rotation of the engine is occurring, when the operation of the starter motor has stopped; and
   stopping an operation of the engine by stopping at least one of fuel injection and ignition of the engine when the reverse rotation of the engine is occurring.

2. The method of claim 1, further comprising determining if starting of the engine is finished when the monitoring condition is not satisfied, wherein the determining if the predetermined monitoring condition is satisfied is executed when the starting of the engine is not finished.

3. The method of claim 1, wherein the predetermined monitoring condition comprises a plurality of conditions including:
   (1) a crank position sensor (CPS) and a vehicle speed detector operate normally;
   (2) an ignition key is in an on position;
   (3) an engine speed is less than or equal to a predetermined reference engine speed or a rate of change of the engine speed is less than or equal to a predetermined rate of change;
   (4) sufficient signals are obtained from the CPS such that cylinders may be identifiable on the basis thereof; and
   (5) a vehicle speed is less than or equal to a predetermined reference vehicle speed.

4. The method of claim 3, wherein:
   the reference engine speed is preset lower than a predetermined idle speed of the engine; and
   the predetermined engine speed rate of change is a negative value such that an engine stall may be expected in the case that the rate of change of the engine speed becomes less than the predetermined rate of change.

5. The method of claim 3, wherein the reference vehicle speed is preset as a minimal value indicative of a running of the vehicle.

6. The method of claim 1, wherein whether the operation of a starter motor has stopped is determined on the basis of a current battery voltage of the vehicle.

7. The method of claim 6, wherein whether the operation of a starter motor has stopped is determined on the basis of whether the current battery voltage is greater than a predetermined voltage, the predetermined voltage being lower than a battery voltage output in the case that the engine is stopped.

8. The method of claim 1, wherein whether the reverse rotation of the engine is occurring is determined on the basis of intervals between adjacent signals from the CPS.

9. The method of claim 8, wherein:
   the intervals between adjacent signals comprise first, second, and third intervals that are consecutively obtained; and
   whether the reverse rotation of the engine is occurring is determined on the basis of whether the second interval is greater than the first and third intervals and also greater than a predetermined reference interval.

10. The method of claim 1, further comprising identifying a reversion-triggering cylinder which is in a compression stroke at the time when the reverse rotation of the engine is occurring.

11. The method of claim 10, wherein the identifying a reversion-triggering cylinder identifies the reversion-triggering cylinder on the basis of:
   a predetermined combustion sequence of cylinders of the engine; and
   TDC of a compression stroke of a reference cylinder, the TDC being determined by a reference pulse of a CPS signal.

12. The method of claim 10, further comprising calculating a piston angle of the reversion-triggering cylinder at the time of occurrence of the reverse rotation of the engine, wherein whether the reverse rotation of the engine is occurring is determined on the basis of the piston angle of the reversion-triggering cylinder.

13. The method of claim 12, wherein the reverse rotation of the engine is determined to be occurring when the piston angle of the reversion-triggering cylinder lies in a range preceding TDC of the reversion-triggering cylinder.

14. The method of claim 8, wherein the determining a reversion-triggering cylinder determines the reversion-triggering cylinder on the basis of:
   a predetermined combustion sequence of cylinders of the engine; and
   TDC of a compression stroke of a reference cylinder as determined by a reference pulse of a CPS signal.

15. The method of claim 14, further comprising calculating a piston angle of the reversion-triggering cylinder at the time of occurrence of the reverse rotation of the engine, wherein whether the reverse rotation of the engine is occurring is determined on the further basis of the piston angle of the reversion-triggering cylinder.

16. The method of claim 15, wherein the reverse rotation of the engine is determined to be occurring when the piston angle of the reversion-triggering cylinder lies in a range preceding TDC of the reversion-triggering cylinder.

* * * * *